(12) United States Patent
Hornig et al.

(10) Patent No.: US 7,485,329 B2
(45) Date of Patent: Feb. 3, 2009

(54) SEMIWET FEED PRODUCT

(75) Inventors: Rolf Hornig, Kirchlinteln/Luttum (DE); Jurgen Hommola, Minden (DE); Botho Stein Von Kamienski, Verden-Walle (DE)

(73) Assignee: Mars Incorporated, McLean, VA (US)

( * ) Notice: Subject to any disclaimer, the term of this patent is extended or adjusted under 35 U.S.C. 154(b) by 132 days.

(21) Appl. No.: 11/582,604

(22) Filed: Oct. 18, 2006

(65) Prior Publication Data

US 2007/0031540 A1 Feb. 8, 2007

Related U.S. Application Data

(63) Continuation of application No. 10/204,869, filed on Dec. 5, 2002, now abandoned.

(30) Foreign Application Priority Data

Feb. 29, 2000 (DE) ................. 100 09 510

(51) Int. Cl.
*A23K 1/00* (2006.01)
(52) U.S. Cl. ............ 426/89; 426/74; 426/106; 426/601; 426/805
(58) Field of Classification Search ............ 426/89, 426/74, 106, 601, 805
See application file for complete search history.

(56) References Cited

U.S. PATENT DOCUMENTS

| 3,284,211 | A | 11/1966 | Williams |
| 3,748,819 | A | 7/1973 | Christensson et al. |
| 3,852,483 | A | 12/1974 | Oborsh et al. |
| 4,022,915 | A | 5/1977 | Zukerman |
| 4,330,562 | A | 5/1982 | Nassar |
| 4,371,556 | A | 2/1983 | Pitchon et al. |
| 4,688,369 | A | 8/1987 | Cornish et al. |
| 4,861,606 | A | 8/1989 | Jensen |
| 5,716,655 | A | 2/1998 | Hamstra et al. |
| 6,517,903 | B1 | 2/2003 | Schmidt et al. |

FOREIGN PATENT DOCUMENTS

| CA | 11003978 | 1/1981 |
| DE | 31 35 867 A1 | 3/1983 |
| DE | PCT/DE99/03973 A1 | 6/2000 |
| EP | 0 927 522 A1 | 3/1998 |
| GB | 2 232 573 | 12/1990 |
| WO | WO 00/33674 | 6/2000 |

*Primary Examiner*—C. Sayala
(74) *Attorney, Agent, or Firm*—Fulbright & Jaworski, L.L.P.

(57) ABSTRACT

Semiwet feed product with a wrapping coating applied by a vacuum coating method, process for the manufacture of such a product, method for packaging the same and product packed using said method.

5 Claims, No Drawings

SEMIWET FEED PRODUCT

CROSS-REFERENCE TO RELATED APPLICATIONS

This application is a continuation of application Ser. No. 10/204,869 now abandoned filed Dec. 5, 2002 which is a national stage filing of PCT/DE01/00760 filed Feb. 28, 2001 claiming priority to DE 100 09 510.0 filed Feb. 29, 2000.

TECHNICAL FIELD

The present invention relates to a semiwet feed product, a process for its production, a method for its packaging and the product by the latter method.

BACKGROUND OF THE INVENTION

Semiwet feeds, particularly for domestic animals such as dogs and cats, are conventionally produced by extrusion, followed by the cutting up of the extruded strand or extrudate and then frying the cut off pieces yielding products with a moisture content of approximately 17 to 22%.

The packaging of such products gives rise to problems in that due to excessive compression of the product pieces which have a fatty outside they stick together after a short time to form a block, which makes it difficult to separate the product for portioning on feeding after the opening of the pack and may even make it in part impossible. Thus, the vacuum packaging of such products is impossible. This requires a large amount of space during transportation and storage.

The problem of the present invention is therefore to provide a semiwet feed product, in which the described problems can be avoided and which can in particular be packed in space and cost-saving manner.

BRIEF SUMMARY OF THE INVENTION

According to the invention, this problem is solved by a semiwet feed product, which has a wrapping coating applied by a vacuum coating method.

In a preferred embodiment the wrapping coating is fat-containing and in particular in preferred manner contains further nutrients and/or supplements, particularly a trace element mixture.

The invention also relates to a process for the production of a semiwet feed product, in which the product pieces extruded, cut and optionally dried to the desired moisture content in the conventional manner are provided in a vacuum coating method with a wrapping coating, which is preferably fat-containing and in particularly preferred manner contains further nutrients and/or supplements, particularly a trace element mixture.

The invention also relates to a method for the packaging of the semiwet feed product according to the invention, in which in conventional manner the product is introduced into a plastic bag pack and prior to the final sealing of the packs is compressed and shaped by exerting pressure on the product.

The invention finally relates to a packed feed product manufactured according to the aforementioned method.

DETAILED DESCRIPTION OF THE INVENTION

It has surprisingly been found that a semiwet feed product provided with a wrapping coating applied by a vacuum coating method, unlike conventional fried products, has no block formation tendency (as described hereinbefore) when packed, accompanied by compression, in a conventional plastic bag pack. Even after storage for several weeks or months a problem-free separation and therefore portioning of the pack content is possible on opening the pack. It is possible in this way to pack a semiwet feed product in a compressed, space-saving form. Compression leads to a distinct bulk density increase and permits an almost random shaping of the pack. In addition, such a product is very uniformly covered with the coating and, despite a similar fat content, has a less fatty feel and is therefore more pleasant for handling by the pet owner. The semiwet feed product wrapped by the vacuum coating method has a very flexible, soft texture, which is highly advantageous from the esthetic standpoint.

Such a product is obtained that the product pieces extruded, cut and optionally dried to the desired moisture content in the conventional manner are provided in a vacuum coating method with a preferably fat-containing wrapping coating. Such vacuum coating methods are known per se from the prior art.

For the application of vacuum coating methods on filling feed pieces with additional substances reference is made to U.S. Pat. Nos. 4,371,556; 861,606 and 5,716,655. However, they all relate to applications in connection with dry products and make no reference to the described advantages in connection with semiwet feed products.

In vacuum coating methods, the product pieces are exposed to a vacuum and in this state, i.e. under a reduced pressure, are covered with a flowable coating material. In an exemplified method, an extruded strand leaves the extruder at a temperature of approximately 100° C. . Normally the moisture content at this point is approximately 25%. Either before or after cutting, the extruded product can, if necessary, be dried to the desired final moisture content of between 17 and 22%.

Subsequently, the product pieces are filled into a corresponding mixer. The mixer filling opening is closed and the internal pressure is reduced within a relatively short time of e.g. approximately 15 seconds to e.g. approximately 200 millibar. Subsequently the coating material (e.g. fat with a trace element mixture) is introduced into the mixer and the extruded material is mixed therewith. The pressure in the mixer is then again raised to ambient temperature, which leaves a product provided with a corresponding wrapping, which can be subsequently supplied to a standard packaging station.

In said packaging station the product is filled in per se known manner into a plastic bag pack of corresponding size. By exerting pressure the content is compressed and shaped, before the pack is finally sealed in the conventional manner.

The features of the invention disclosed in the above description, the drawings and claims can be essential to the implementation of the different embodiments of the invention, either singly or in random combination.

What is claimed:

1. A method of packing a semiwet animal feed product comprising the steps of:
   preparing an extruded semiwet animal feed product comprising feed product pieces and drying the extruded pieces to a final moisture content of 17 to 22%;
   filling a mixer with the pieces and reducing the internal pressure to create a vacuum;
   introducing a coating material into the mixer and mixing it with the pieces;
   raising the pressure in the mixer wherein the pressure change produces a non-sticky coating on the pieces;
   introducing the non-sticky coated semiwet animal feed product pieces into a plastic packaging;

compressing the packaging by exertion of pressure on the packaging; and sealing the compressed packaging to produce a package of freely separateable pieces of the semiwet animal feed product.

2. The method according to claim 1, wherein the internal pressure is reduce to 200 millibars.

3. The method according to claim 1, wherein the coating contains fat.

4. The method according to claim 1, wherein the coating contains further nutrients and/or supplements.

5. The method according to claim 4, wherein the coating contains a trace element mixture.

* * * * *